United States Patent [19]

Jaecklin et al.

[11] 3,789,248

[45] Jan. 29, 1974

[54] HOLDER MEMBER FOR A SEMICONDUCTOR ELEMENT

[76] Inventors: Andre Jaecklin, Goldwandstrasse 35, Ennetbaden; Otto Schärli, Muhlbergweg 2, Baden, both of Switzerland

[22] Filed: July 18, 1972

[21] Appl. No.: 272,729

[30] Foreign Application Priority Data

July 20, 1971 Switzerland ........................ 10713/71

[52] U.S. Cl. ............ 310/9.4, 174/15 R, 317/234 A, 310/9.2

[51] Int. Cl. ............................................... H01v 7/00

[58] Field of Search ........................ 310/9.1–9.4, 8.2; 317/234 A; 174/15 R

[56] References Cited

UNITED STATES PATENTS

| | | | |
|---|---|---|---|
| 3,619,473 | 11/1971 | Meyerhoff | 174/15 R |
| 3,185,870 | 5/1965 | Stoddard et al. | 310/9.4 |
| 2,078,284 | 4/1937 | Schrader | 310/9.2 |
| 2,124,596 | 7/1938 | Sykes | 310/9.4 |
| 2,278,966 | 4/1942 | Williams | 310/9.1 X |

*Primary Examiner*—J. D. Miller
*Assistant Examiner*—Mark O. Budd
*Attorney, Agent, or Firm*—David Toren et al.

[57] ABSTRACT

A holder for a semiconductor element includes a pair of spaced support plates each resiliently biased against one of a pair of pressure plates which are located between the support plates. The semiconductor element is held between the pressure plates. The contacting surfaces of the support plates and the pressure plates each has a different radius of curvature. Various embodiments of the contacting surfaces of the support plates and the pressure plates include a convexly shaped projection on one with a convex, concave or planar surface on the other. Further, the contacting surfaces can be provided by an intermediate member positioned between the oppositely facing plates and with the intermediate member having a convex or spherically shaped contacting surface. The contacting surfaces are arranged for transforming a part of the kinetic energy developed under dynamic mechanical stress into frictional heat, such as by providing at least one of the contacting surfaces with a coefficient of friction between 0.025 and 0.3. In a preferred embodiment at least one of the contacting surfaces is provided with a coating of titanium carbide.

6 Claims, 5 Drawing Figures

HOLDER MEMBER FOR A SEMICONDUCTOR ELEMENT

SUMMARY OF THE INVENTION

The present invention is directed to a holder member or device which clamps at least one semiconductor element between a pair of pressure plates and, more particularly, it concerns a clamping arrangement for biasing the pressure plates against the semiconductor element in which the contacting surfaces between the clamping means and the pressure plates each has a different radius of curvature and the contacting surfaces are arranged to transform a part of the kinetic energy developed in dynamic mechanical stresses into frictional heat.

A holder member of the general type to which the present invention is directed, is disclosed in application Ser. No. 231,959, filed Mar. 6, 1972.

Generally, a number of semiconductor elements, typically seven thyristors in HGUe applications, are combined in a column in holders of the type mentioned above. In a static case, due to the special design of the contacting surfaces, the pressure over the surfaces of the semiconductor elements can be considered as a constant. However, in a case where dynamic mechanical stresses act on the column within the holder, for example, when the column turns over or when it is in a free fall from a moderate height, pressure increases may occur which exceed admissible limits and such increases can lead to the destruction of the semiconductor elements.

It has been suggested to equip the holder with springs to overcome this problem, however, it has been only partly successful, particularly because the size of the springs leads to impractical dimensions.

Therefore, it is the primary object of the present invention to afford an improvement of the holder arrangement disclosed in the above-mentioned patent application in which pressure increases, due to dynamic mechanical stress, remain within certain harmless limits.

In accordance with the present invention, the holder device is characterized in that the contacting surfaces, which are resiliently biased against one another, are arranged so that a part of the kinetic energy developed in dynamic mechanical stress is transformed into frictional heat.

In such a holder device, excellent results have been achieved when at least one of the contacting surfaces on each side of the semiconductor element has a coefficient of friction between 0.025 and 0.3, preferably between 0.05 and 0.2, and with the contacting surfaces having a hardness such that substantially no plastic deformation takes place under the clamping action of the holder device.

In a preferred embodiment of the invention, at least one of the bearing surfaces located on each of the opposite sides of the semiconductor element, that is, either the bearing surface of the pressure plates between which the semiconductor element is located or of the support plates which clamp the pressure plates, is provided with a coating of titanium carbide. However, plastic material with properties similar to titanium carbide can be used for the same purpose.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figures 1, 1A, 1B, 1C, 2, 2A, 2B, 2C:
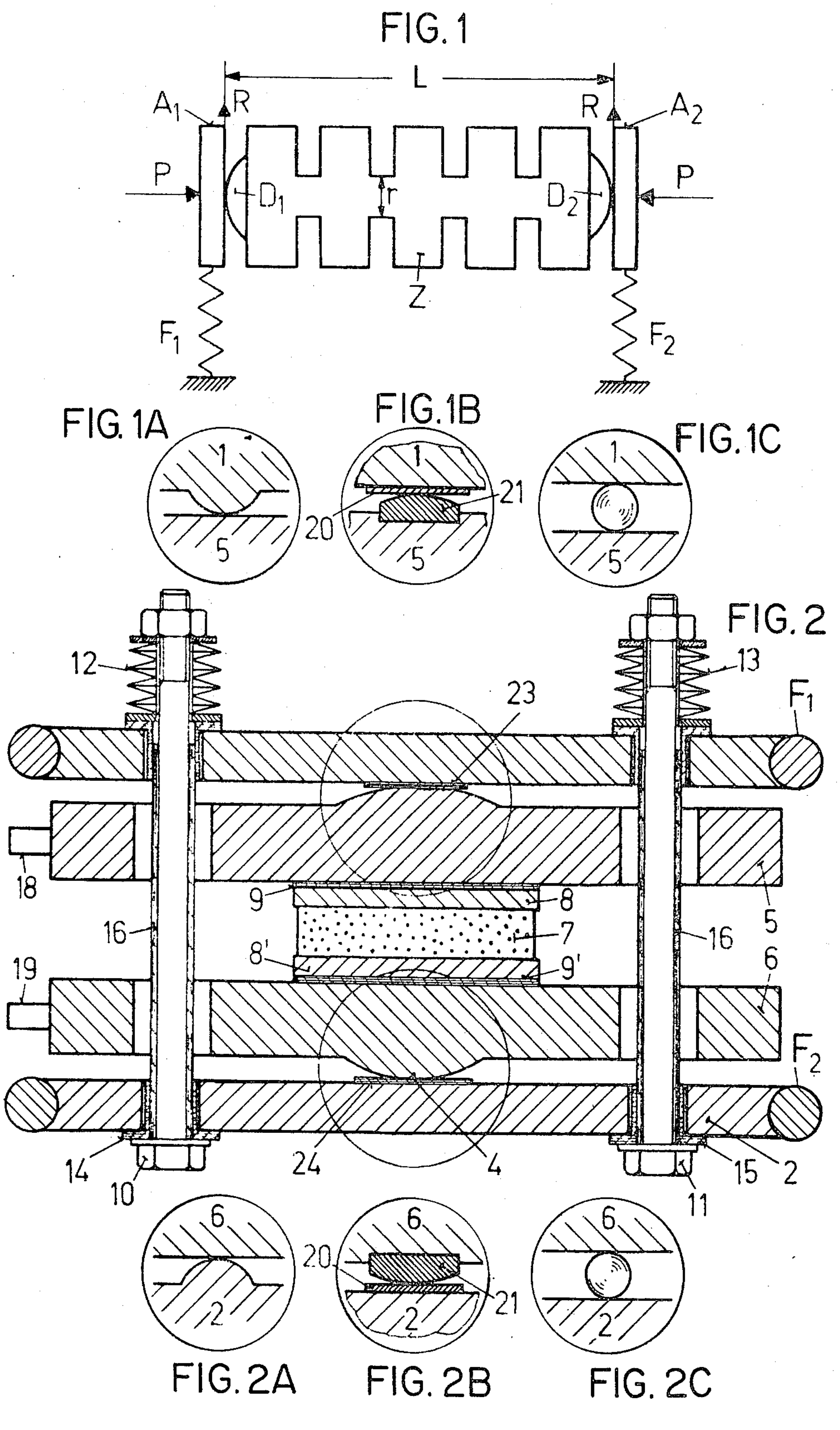
FIG. 1 is a schematic illustration of a holder device embodying the present invention.
FIG. 2 is a cross sectional view of a holder device embodying the present invention and FIG. 2A, 2B, and 2C are alternate embodiments.

In FIG. 1 a holder device is schematically represented by a cylinder Z extending between a pair of spaced supports $A_1$, $A_2$. THe cylinder Z has a plurality of spaced recesses along its length. The clamping pressure P is indicated by arrows. Cylinder Z represents a column consisting of a multiple number of parts, such as semiconductor bodies, pressure pieces, cooling bodies and the like. At each of its opposite end faces, the cylinder has a dome-shaped contact surface $D_1$, $D_2$ in contact with the supports $A_1$, $A_2$, respectively. Each of the supports $A_1$, $A_2$ is provided with a spring $F_1$, $F_2$.

In a free fall from a height h onto an inflexible surface, a force R is developed in the holder device as shown in FIG. 1. As soon as the force R exceeds the limit of static friction, the elongation of the springs $F_1$, $F_2$ remains constant, and the column clamped between the supports $A_1$, $A_2$ is displaced within the supports (sliding friction) until the remaining kinetic energy is dissipated. Assuming that the spring energy is negligible and that the entire kinetic energy is transformed into frictional heat, the entire column is displaced by the amount:

$$\Delta z = mgh/2\ \mu_G P$$

In the above equation, $\mu G$ denotes the coefficient of sliding friction, P the clamping pressure, m the mass of the column, g the gravity, and h the height of fall.

Such a system, where sliding takes place simultaneously at two locations, is not unstable. It can be shown by the motion equations that in a case of unsymmetrical conditions, for example, if unequal coefficients of friction are present at the contacting surfaces, a correspondingly higher friction force R is immediately established until symmetical sliding develops. Similarly, unilateral sliding due to unilateral acceleration is equally harmless.

In the following, the extent of the stress and the amount of displacement are illustrated on the basis of a numerical example. The following values are taken from a typical practical case: $\mu_H \approx \mu_G = 0.15$ (TiC coating) $L = 30$ cm $h = 50$ cm $m = 5$ kg $P = 1$ Mp $r = 1.4$ cm (smallest diameter of the column, corresponding to the smallest diameter of an intermediate element, for example, a semiconductor body or a molybdenum disk)

Based on these values, the displacement of the column is $$\Delta z = 0.52 \text{ cm}$$

The relative overtension, at the point of highest stress, that is, in symmetrical arrangements generally in the center of the column, is 1.2. This value can be considered admissible in such arrangements.

In FIG. 2 an embodiment of a holder device in accordance with the present invention is shown, and located centrally within the device is a semiconductor body 7, for example, of silicon. The semiconductor body has one or several pn-junctions, not shown. The end faces of the semiconductor body 7 are provided with alloyed carrier plates 8, 8', formed, for example, of molybdenum. The contact surfaces of the semiconductor body can be provided in other ways, for example, in the manner described in DAS No. 1,273,073. On each of the opposite sides of the semiconductor body 7, its carrier plates 8, 8' are contacted by pressure plates 5, 6, if necessary with the interposition of silver foils 9, 9'. The pressure plates 5, 6 can be formed of copper or copper alloy and designed as cooling bodies. The assembly of the pressure plates, the carrier plates and the semiconductor body is clamped between a pair of support plates 1, 2. The surfaces of the support plates 1, 2 directed toward the pressure plates 5, 6 are provided in the range of the contacting surfaces with the pressure plates, as well as in a certain surrounding area, with a titanium carbide coating 23, 24. In general, coatings at the contacting surfaces can be used whose coefficient of friction is between 0.025 and 0.3, and preferably between 0.05 and 0.2. Another feature of the coating is that it does not undergo any substantial plastic deformation due to the clamping action involved. Such deformation would increase the coefficient of friction and jeopardize the desired effect of the coating as a friction brake.

In a practical embodiment of the holder device, formed in accordance with the present invention, a titanium carbide coating was deposited on the contacting surfaces by means of a chemical separation from the gaseous phase. Such methods for the treatment of metal surfaces are known, for example, note "Schweizer Archiv," June 1967, pages 157–166. The coefficient of friction achieved with such a coating was 0.15 (note the above example).

Other coating materials can be used, provided their properties meet the requirements mentioned above. Accordingly, so-called plastic bearing materials, such as polyamides, laminated fabrics and the like can be used for this purpose.

As an alternative to coating the support plates, it is also possible to coat the corresponding surfaces of the pressure plates and an improved arrangement could be provided by coating both of the contacting surfaces of the pressure plates and the support plates.

Similar to the disclosure contained in the above-mentioned U.S. patent application, at the location of the contacting surfaces, the pressure plates have generally convex projections 3, 4 directed toward the support plates 1, 2. As illustrated in FIG. 2, these projections 3,4 have a dome-shaped configuration. In FIG. 2 the contacting surfaces of the support plates 1,2 are represented as being planar, however, they can also be convex or concave. Similarly, the above-described arrangements can be reversed with the dome-shaped projection formed on the support plates 1,2 and the planar, convex or concave surfaces formed on the pressure plates. In the alternate embodiment A in FIG. 2 the dome-shaped projection is shown on the surfaces of the support plates 1, 2.

As shown in embodiment B of FIG. 2, intermediate pieces 20, 21 can be provided between the support plates 1,2 and the pressure plates 5,6 or, as shown in alternate embodiment C, a spherical member or ball can be positioned between the spaced surfaces of the support plates 1,2 and the pressure plates 5, 6. Further, though not shown in the drawing, a lens-shaped body could be positioned between the adjacent surfaces of the support plates 1,2 and the pressure plates 5, 6. The intermediate pieces 20, 21, the ball, or the lens-shaped body can be provided with the above-mentioned coating or they can be formed of a suitable material having a corresponding coefficient of friction. These alternate embodiments have the advantage of providing a very economical arrangement.

With regard to the variation shown in embodiment A, it is possible, if desired, to assemble several arrangements in the form a column each consisting of a pair of pressure plates or cooling bodies with an interposed semiconductor element. Suitable insulating layers would be provided between adjoining pressure plates to separate the potential.

For establishing the clamping pressure in the holder device, a pair of bolts 10, 11 are shown in FIG. 2 extending between and through the two spaced support plates 1, 2. The bolts bear against the support plate 1 over cup springs 12, 13 and against the support plate 2 over insulating parts 14, 15. The portion of the bolts 10, 11 extending between the support plates are enclosed by insulating jackets 16. If, as shown in FIG. 2, the pressure plates 5, 6 project laterally beyond the position of the bolts 12, 13, they are provided with bores or openings through which the bolts pass. In dimensioning the bores or openings, care must be taken that a sufficient clearance is provided between the bolts and the surfaces of the pressure plates forming the bores or openings. The clearance or spacing between the bolts and the pressure plates is required, on one hand, not to interfere with radial movement during assembly, caused by the type of clamping used, and on the other hand not to prevent lateral displacement of the column located between the support plates under the action of dynamic mechanical stress.

During the operation of the holder device, it is inadvisable to conduct current across the contacting surfaces between the support plates and the pressure plates, accordingly, as shown in FIG. 2, each of the pressure plates is provided with a connecting elecrode 18, 19.

In a practical embodiment of the invention, care must be taken that the maximum surface pressure between the contacting surfaces, that is between the contacting surfaces of the support plates 1, 2 and the pressure plates 5, 6, remains below the elastic limit (Hertz pressure). By the proper selection of the material used and of the radii of curvature of the contacting surfaces, it is possible to maintain the required conditions for any desired clamping pressure. The titanium carbide coating, which can have a thickness in the range of 1 $\mu$m to 100 $\mu$m, has great influence.

Accordingly, the minimum radius for the contacting surfaces, where both contacting surfaces are formed of tempered steel with a modulus of elasticity of $E = 2.1 \times 10^4$ kg/mm², with an elastic limit of 200 kg/mm², with a clamping pressure of $P = 2,000$ kp is $$r_{min} = 82 \text{ mm}$$

The thickness of the titanium carbide coating is betwwen 5 and 30 $\mu$m. The radius of a contacting surface can be reduced if instead of being planar it has a concave surface.

Further, a reduction of $r$-min is also permissible if the holder device is to be used only once. In such an instance, the compensation of errors of parallelism is effected with a lower clamping pressure, that is, before the surface pressure in the contacting surfaces exceeds the elastic limit. As shown in FIG. 2, the peripheral edges of the support plates 1 and 2 are provided with rubber rings $F_1$, $F_2$ which act as springs for avoiding shock waves when dynamic mechanical stress is experienced in the device.

Among the advantages attained by the use of the present invention are the following: the column clamped between the support plates is adjusted automatically during assembly for any errors in parallelism in the surfaces under pressure contact without damaging the highly sensitive semiconductor elements, and any damage which might occur due to dynamic mechanical stresses caused during the handling of the holder device is prevented by the "built-in" friction brake. Both of these advantages are obtained by the use of the holder device, according to the present invention, in which fully diffused systems can be contacted without attaching carrier plates by alloying or soldering.

We claim:

1. A holder device for holding at least one semiconductor element, comprises a pair of pressure plates arranged in oppositely disposed spaced relationship for holding at least one semiconductor element between them, clamping means including spring means for biasing said pressure plates against the semiconductor element from both sides, said clamping means and pressure plates forming a pair of contacting surfaces on each side of said semiconductor element and each pair of contacting surfaces at the location of contact having different radii of curvature, wherein the improvement comprises means forming said contacting surfaces for transforming a part of the kinetic energy developed under dynamic mechanical stress into frictional heat, at least one of the contacting surfaces of each said pair of contacting surfaces on each side of said semiconductor element having a coefficient of friction between 0.025 and 0.3, and at least one of the contacting surfaces of each pair of contacting surfaces on each side of said semiconductor element having a metallic carbide coating.

2. A holder device for holding at least one semiconductor element, comprises a pair of pressure plates arranged in oppositely disposed spaced relationship for holding at least one semiconductor element between them, clamping means including spring means for biasing said pressure plates against the semiconductor element from both sides, said clamping means and said pressure plates forming a pair of contacting surfaces on each side of said semiconductor element and each pair of contacting surfaces at the location of contact having different radii of curvature, wherein the improvement comprises means forming said contacting surfaces for transforming a part of the kinetic energy developed under dynamic mechanical stress into frictional heat, at least one of the contacting surfaces of each said pair of contacting surfaces on each side of said semiconductor element having a coefficient of friction between 0.025 and 0.3, and at least one of the contacting surfaces is provided by an arcuately-shaped intermediate piece having having a carbide metal coating.

3. A holder device, as set forth in claim 1, wherein said metallic carbide coating has a thickness in the range of 1 $\mu$m to 100 $\mu$m.

4. A holder device, as set forth in claim 3, wherein the thickness of the metallic carbide coating is in the range of 5 $\mu$m to 30 $\mu$m.

5. A holder device, as set forth in claim 3, wherein the metallic carbide coating is formed of titanium carbide.

6. A holder device, as set forth in claim 2, wherein the metallic carbide coating on said intermediate piece is formed of titanium carbide.

* * * * *